United States Patent
Rozental

(10) Patent No.: US 10,726,449 B2
(45) Date of Patent: Jul. 28, 2020

(54) SYSTEM AND METHOD FOR EXTRACTING AND PUBLISHING INFORMATION CAPTURED BY POINT OF SALE, POINT OF SERVICE, AND OTHER ORDER MANAGEMENT AND SALES TRANSACTIONS RECORDING SYSTEMS FOR POSITIVELY INFLUENCING INTERNET SEARCH ENGINE RESULTS

(71) Applicant: Arkadiy I Rozental, Owings Mills, MD (US)

(72) Inventor: Arkadiy I Rozental, Owings Mills, MD (US)

( * ) Notice: Subject to any disclaimer, the term of this patent is extended or adjusted under 35 U.S.C. 154(b) by 596 days.

(21) Appl. No.: 14/971,519

(22) Filed: Dec. 16, 2015

(65) Prior Publication Data
US 2016/0171549 A1   Jun. 16, 2016

Related U.S. Application Data

(60) Provisional application No. 62/092,513, filed on Dec. 16, 2014.

(51) Int. Cl.
*G06Q 30/02*   (2012.01)
*G06F 16/951*   (2019.01)
*G06F 16/958*   (2019.01)

(52) U.S. Cl.
CPC ....... *G06Q 30/0263* (2013.01); *G06F 16/951* (2019.01); *G06F 16/972* (2019.01)

(58) Field of Classification Search
CPC .......... G06Q 30/0263; G06F 17/30864; G06F 17/30539
See application file for complete search history.

(56) References Cited

U.S. PATENT DOCUMENTS 6,269,361 B1 * 7/2001 Davis ............... G06Q 30/02
6,768,994 B1 * 7/2004 Howard ............ G06F 16/9537
(Continued)

OTHER PUBLICATIONS

Thomaidou, S. and Vazirgiannis, M., Jul. 2011, Multiword keyword recommendation system for online advertising. In 2011 International Conference on Advances in Social Networks Analysis and Mining (pp. 423-427). IEEE. (Year: 2011).*
(Continued)

*Primary Examiner* — Luis A Brown
*Assistant Examiner* — Robert C Johnson
(74) *Attorney, Agent, or Firm* — Royal W. Craig; Gordon Feinblatt LLC

(57) ABSTRACT

A system and software method for monitoring and mining work order information from a remote OMS system and automatically generating and continuously updating web content therefrom to positively influence ranking in a listing of search results. The software method comprises the steps of monitoring the OMS system for completion of each work order, upon completion querying the OMS for information related to the service and/or goods provided, compiling a file of information related to the service and/or goods provided, mining relevant information from the file based on a pre-programmed ruleset, and sending the relevant information to an HTML authoring module that automatically generates web content therefrom and posts it to the clients web site to positively influence search engine rankings in response to a key phrase query that is relevant to the service completed and/or goods provided.

11 Claims, 6 Drawing Sheets

(56) References Cited

U.S. PATENT DOCUMENTS

| | | | | |
|---|---|---|---|---|
| 6,785,671 | B1* | 8/2004 | Bailey | G06Q 10/02 |
| | | | | 705/5 |
| 2002/0091756 | A1* | 7/2002 | Goodwin | G06F 11/1446 |
| | | | | 709/203 |
| 2003/0195877 | A1* | 10/2003 | Ford | G06Q 30/02 |
| 2005/0080805 | A1* | 4/2005 | Haeberle | G06Q 10/10 |
| 2005/0086239 | A1* | 4/2005 | Swann | G06Q 10/087 |
| 2009/0299998 | A1* | 12/2009 | Kim | G06F 16/951 |
| 2010/0217665 | A1* | 8/2010 | Sharma | G06Q 30/02 |
| | | | | 705/14.45 |
| 2011/0231223 | A1* | 9/2011 | Winters | G06Q 30/0201 |
| | | | | 705/7.29 |
| 2012/0158500 | A1* | 6/2012 | Hochstatter | G06Q 30/0255 |
| | | | | 705/14.53 |
| 2014/0108428 | A1* | 4/2014 | Luo | G06Q 10/10 |
| | | | | 707/748 |
| 2016/0171549 | A1* | 6/2016 | Rozental | G06F 16/951 |
| | | | | 705/14.6 |

OTHER PUBLICATIONS

Yih, W.T., Goodman, J. and Carvalho, V.R., May 2006, Finding advertising keywords on web pages. In Proceedings of the 15th international conference on World Wide Web (pp. 213-222). (Year: 2006).*

* cited by examiner

FIG. 3

SYSTEM AND METHOD FOR EXTRACTING AND PUBLISHING INFORMATION CAPTURED BY POINT OF SALE, POINT OF SERVICE, AND OTHER ORDER MANAGEMENT AND SALES TRANSACTIONS RECORDING SYSTEMS FOR POSITIVELY INFLUENCING INTERNET SEARCH ENGINE RESULTS

CROSS-REFERENCE TO RELATED APPLICATION(S)

The present application derives priority from U.S. Provisional Patent Application Ser. No. 62/092,513 filed 16 Dec. 2014.

BACKGROUND OF THE INVENTION

1. Field of the Invention

The present invention relates generally to online marketing and, more particularly, to an automated system and method for enabling sales- and service-oriented organizations to influence a position on a search result listing generated by an Internet search engine for a specified set of search terms that is highly relevant to the goods and services that said organizations offer in the marketplace.

2. Description of the Background

A variety of major search engines exist to index and search the information available on the internet so that users can locate information of interest. These major search engines such as Google®, Yahoo®, etc., enable consumers to search the Internet for a listing of web sites based on a specific topic, product, or service of interest. The resulting listing is typically ranked by relevance, and the consumer tends to pay more attention to the higher-ranked results. When marketers invest in a web site, they do so in expectation that potential customers will find it high up in search results.

All major search engines rely on complex, mathematical algorithms that search a database containing a keyword index of the internet. All major search engines select and rank web pages from the index based on multiple criteria such as keyword density and keyword location. The search engines employ a rule-based decision process, with queries such as: is there an exact search phrase match? How many times does a page contain your search words? Do the words appear in the title, in the URL, directly adjacent? Does the page include synonyms of these words? Is this page from a quality web site? A page rank is then formed by combining together all these and many additional proprietary factors for each web page that the search engine found in its index, and the prioritized listing of search results is returned to the consumer.

These search engines often consider invisible text, or "meta tags", in their analysis. Consequently, website owners and third party promoters author their websites and insert meta tags containing popular search terms solely to influence search result ranking. All major search engine proprietors win respect with unbiased highly relevant search results, and so go to great efforts not to allow their rankings manipulated by marketers. They build screening logic into their search engines to detect and ignore covert tactics intended only to influence search result ranking. Online marketers find new covert strategies to avoid detection, and the result is a game of cat-and-mouse.

A more reliable approach to influencing priority in a listing of search results returned by an Internet search engine is to create a true online representation of organizational activities by extracting and publishing information stored in books of business to generate a dynamic stream of relevant web pages that are specifically formatted to help search engines—and therefore users—quickly discover and easily understand highly relevant content they produce. This makes it easier for search engines to index and understand web page content, which in turn helps search engines determine if a web page is a relevant search result to display for a particular search query. While this might seem common-sense, proper and consistent formatting of extracted information that is aligned with search engine optimization best practices is essential.

For example, each time that an auto repair facility solves a complex problem with a customer's vehicle they optimally would describe both problem and solution on their website so that when subsequent consumers experiencing the problem type in relevant key words, the facility is ranked highest. This, of course, takes a continual effort to document each repair and use it to create a web page, over time resulting in a dynamic stream of relevant web pages all including highly specialized formatting to make it easier for search engines to crawl, index and understand content of these web pages. Exceptionally few repair facilities would have time and the know-how to do this right. Compounding the issue, there are only two categories of web site promoters to help them: 1) budget-priced, offering generic content that is manually produced by limited editorial staffs and shared across great many like-clients; and 2) premium-priced, offering highly customized content that is also manually produced by limited editorial staffs, but exclusive to a particular client, which is cost-prohibitive to scale up.

It is therefore an object of the present invention to provide a system and method for automatically generating continuous relevant web content to showcase actual services provided, or products sold, in order to positively influence ranking in a listing of search results algorithmically returned by major Internet search engines in response to a key phrase query that is relevant to services or products that a user provides.

SUMMARY OF THE INVENTION

It is an object of the invention to provide a system and method for influencing a position in a listing of search results returned by an Internet search engine.

It is another object of the invention to provide a system and method as described above that automatically generates continuous relevant web content to showcase actual services provided or products sold, in order to positively influence said ranking in response to a key phrase query that is relevant to those products or services.

In accordance with the foregoing objects, the present invention is a business process system architecture and a unique software method that combine to provide a platform for auto-building web pages that showcase actual services provided or products sold.

The method and system of the present invention are managed and independently verified by a third-party Application Service Provider (ASP). An ASP is a vendor that supplies software applications and/or software services to customers over the Internet. The software applications and data are supported and maintained by the ASP on servers in the ASP's client/server architecture, and the ASP handles the network maintenance and administration.

Toward that end, the system architecture comprises a web-enabled Application Service Provider (ASP) computer server, a web-enabled Client computer server, and a Webhost computer server (hosting the Client website). All are in internet communication with each other, and the ASP has direct or proxy access to the Webhost computer server on behalf of the Client to establish and maintain a client Website.

The modular array of software includes an order management system interface for communicating with the service and/or goods-provider's existing order management system and/or a programmatic rules-based manual data entry interface to compliment information export limits of the service and/or goods-provider's existing order management system; a data mining module configured to access the service and/or goods order management system and selectively produce a result file, and an HTML authoring module for generating one or more web pages using the result file.

The data mining module monitors the service and/or goods order management system for any instance wherein the service and/or goods-provider has completed and/or flagged a service and/or goods-related activity for publishing. Upon detection of such a completed activity, a query is automatically generated based on information related to the service and/or goods. The query is communicated via the order management system interface to the order management system, from which corresponding search results are eventually received. The data mining module analyzes and filters the search results and compiles a profile based thereon for each completed order and/or service request. These profiles are displayed to the user for approval and/or editing. Assuming the user's express or implicit approval, the profiles are passed to the HTML authoring module for autogeneration of content linked to and from the service and/or goods-provider's website. In a preferred embodiment, each auto-generated piece of content is incorporated as an article into the service and/or goods-provider's website to maximize impact on the overall website search engine rankings. Toward this end, each article includes at least 1) an article inception date; 2) programmatic rules-based generated title text mined from the order management system and including unique words, bigrams, or phrases in the title text specific to that service and/or goods order; 3) programmatic rules-based generated anchor text mined from the order management system and including unique words, bigrams, or phrases in the anchor text specific to that service and/or goods order; and 4) a programmatic rules-based generated web address (URL) of the said article.

The present invention is described in greater detail in the detailed description of the invention, and the appended drawings. Additional features and advantages of the invention will be set forth in the description that follows, will be apparent from the description, or may be learned by practicing the invention.

BRIEF DESCRIPTION OF THE DRAWINGS

Other objects, features, and advantages of the present invention will become more apparent from the following detailed description of the preferred embodiments and certain modifications thereof when taken together with the accompanying drawings in which:

FIG. 3 is an exemplary service order management system invoice, marked with the profile elements of interest for the data mining module.

For example.

DETAILED DESCRIPTION OF THE PREFERRED EMBODIMENT

Figure 1:
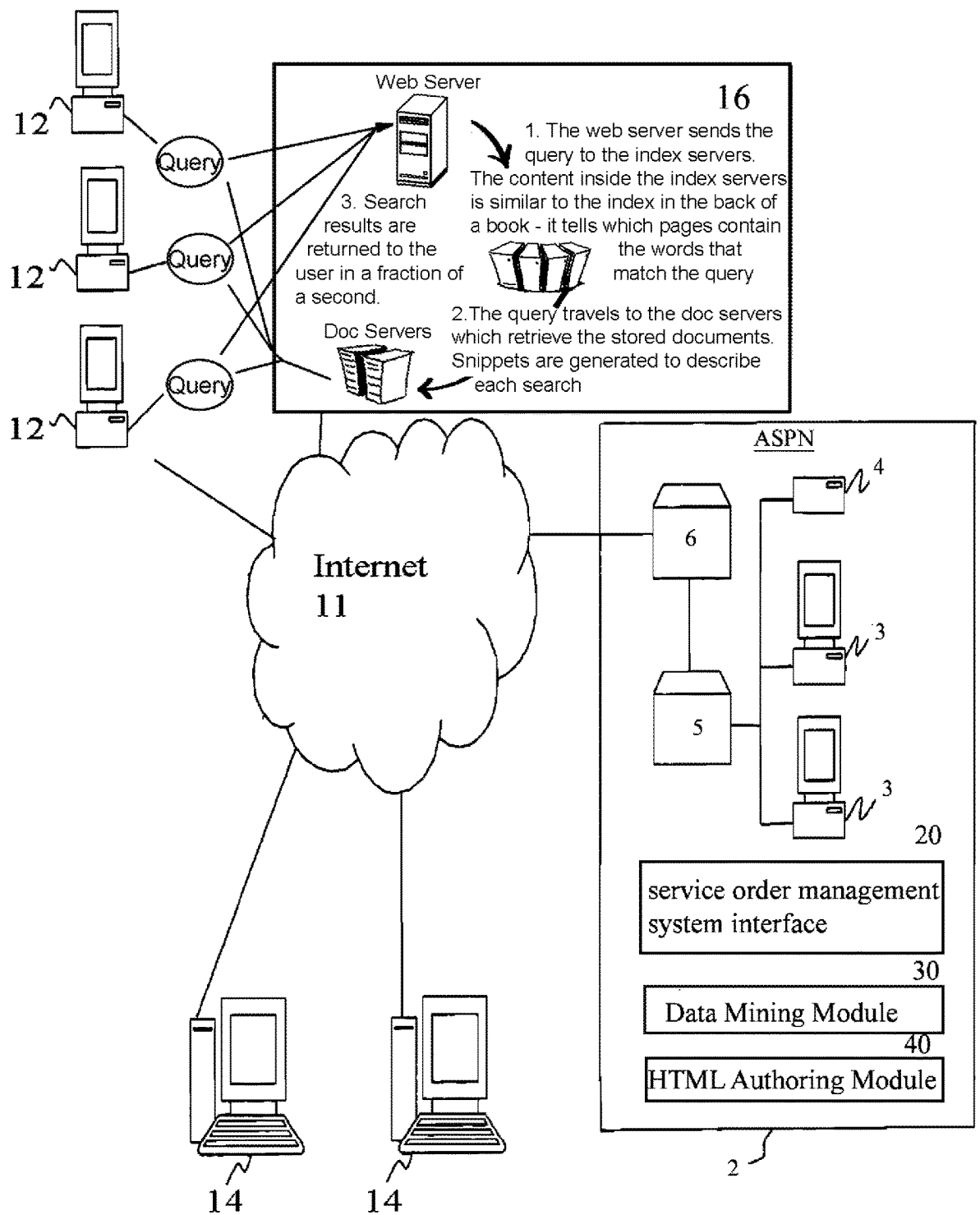
FIG. 1 is a block diagram of an exemplary system architecture illustrating where each module of the array of software resides.

Reference will now be made in detail to preferred embodiments of the present invention, examples of which are illustrated in the accompanying drawings. Wherever possible, the same reference numbers will be used throughout the drawings to refer to the same or like parts As shown in FIG. 1, the system includes a web-enabled client-server hardware architecture and a unique software method that combine to provide a platform for influencing a position in a listing of search results returned by an Internet search engine. The web-enabled client-server hardware architecture and software administered by a third party application service provider (ASP) that provides web promotion services for its Clients.

As shown in FIG. 1, the system includes at least one ASP network 2 ("ASPN") for hosting and allowing administration of the system by administrators using ASP client stations 3. ASP network 2 is in communication via the internet 11 to a plurality of remote consumer computers 12 and client servers 14. The internet, or World Wide Web, provides a known system for interconnecting consumers 12, client servers 14 and ASPN 2 in a communicating relationship. However, other networks may be used, such as satellite networks, the Public Switched Telephone Network, Wi-Fi networks, WiMax networks, cellular networks, and any other public, private, or dedicated networks that might be used to interconnect devices for transfer of data. Any number of consumers 12 and client servers 14 may participate. Both consumers 12 and client servers 14 may be any suitable computing device including mobile devices such as laptops, monitors, POS, POI, PDAs, cell phones and the like, or stationery personal computers. Suitable computing devices have an input device, display, processor, memory (e.g. RAM), a bus which couples the processor and the memory, a mass storage device (e.g. a magnetic hard disk or an optical storage disk) coupled to the processor and the memory through an I/O controller, and a network interface coupled to the processor and the memory, such as a modem, plus a communication port such as a digital subscriber line ("DSL") card, cable modem, network interface card, wireless network card, or other interface device capable of wired, fiber optic, or wireless data communications.

Client servers 14 may be web hosting services that provide space on a web-enabled server owned or leased for use by clients, as well as providing Internet connectivity. Alternately, Client servers 14 may be owned and operated directly by clients that host their own website. In this latter case those clients will typically use an order management system (OMS) to book and manage service and/or goods orders. There are industries that do not use OMS but the core functionality remains the same:

To keep track of customers, accounts, credit verification, product delivery, billing, etc.;

to keep track of orders from customers, stock level maintenance, packaging and shipping workflow management of the fulfillment and billing processes.

As an example Autobiz™ software supports automotive repair shops and provides an interface Scheduler & Timeclock for mechanic tracking and reporting. The workflow tracking is assembled into invoices which are printed and archived electronically. The purpose of the OMS is to streamline the business workflow, but it does this by documenting the entire workflow in a local database for improved efficiency, reduced errors, and an increase in customer satisfaction. The present system automatically and intelligently mines the information in that database and uses it to increase search engine ranking.

Consumers 12 search the Client websites on Client servers 14 using search engines 16 such as Google®. Google® runs on a distributed network of thousands of low-cost computers and can therefore carry out fast parallel processing. Search engines 16 such as Google® have three distinct parts: a web crawler that finds and fetches web pages; an indexer that sorts every word on every page and stores the resulting index of words in a huge database; and a query processor that compares each search query to the index and recommends the documents that it considers most relevant. The use of a search index has several advantages. Google® can also match multi-word phrases and sentences. Also, Google® indexes HTML code in addition to the text on the page, so consumers can restrict searches on the basis of where query words appear, e.g., in the title, in the URL, in the body, and in links to the page, options offered by Google's Advanced Search Form and Using Search Operators (Advanced Operators). Google® considers over a hundred factors in computing a web page rank and determining which documents are most relevant to a query, including the popularity of the page, the position and size of the search terms within the page, and the proximity of the search terms to one another on the page. See United States Patent Application 20140108428 by Luo Qingshan et al. filed Apr. 17, 2014.

ASPN 2 preferably includes a network database 4, preferably an SQL server database, running MySQL (a popular open source database). Other examples of suitable database servers are Oracle™, DB2™, Informix™, Ingres™, and SQL Server™. Network database 4 may be a RAID data storage solution that combines multiple disk drive components into a logical unit for scalable storage.

The ASPN 2 is preferably connected to the internet 11 through a secure gateway 6 which ensures security of subscriber data as well as operating compatibility between the ASPN 2 and the internet 11. The secure gateway 6 may be a Citrix Access Gateway®, or other suitable secure data access solution that provides administrators via ASP clients 3 with software and data-level control. Gateway 6 adds a level of firewall security to the ASPN 2 and ensures operating compatibility between the ASPN 2 and the internet 11.

ASPN 2 includes an application server 5 including non-transitory computer memory hosting the modular array of software of the present invention, and a programmable controller programmed with the software. The modular array of software includes an order management system interface 20 for communicating with the service and/or goods-provider's existing order management system and/or a programmatic rules-based manual data entry interface to compliment information export limits of the service and/or goods-provider's existing order management system; a data mining module 30 configured to access the order management system and selectively produce a result file, and an HTML authoring module 40 for generating one or more web pages using the result file.

Figure 2:
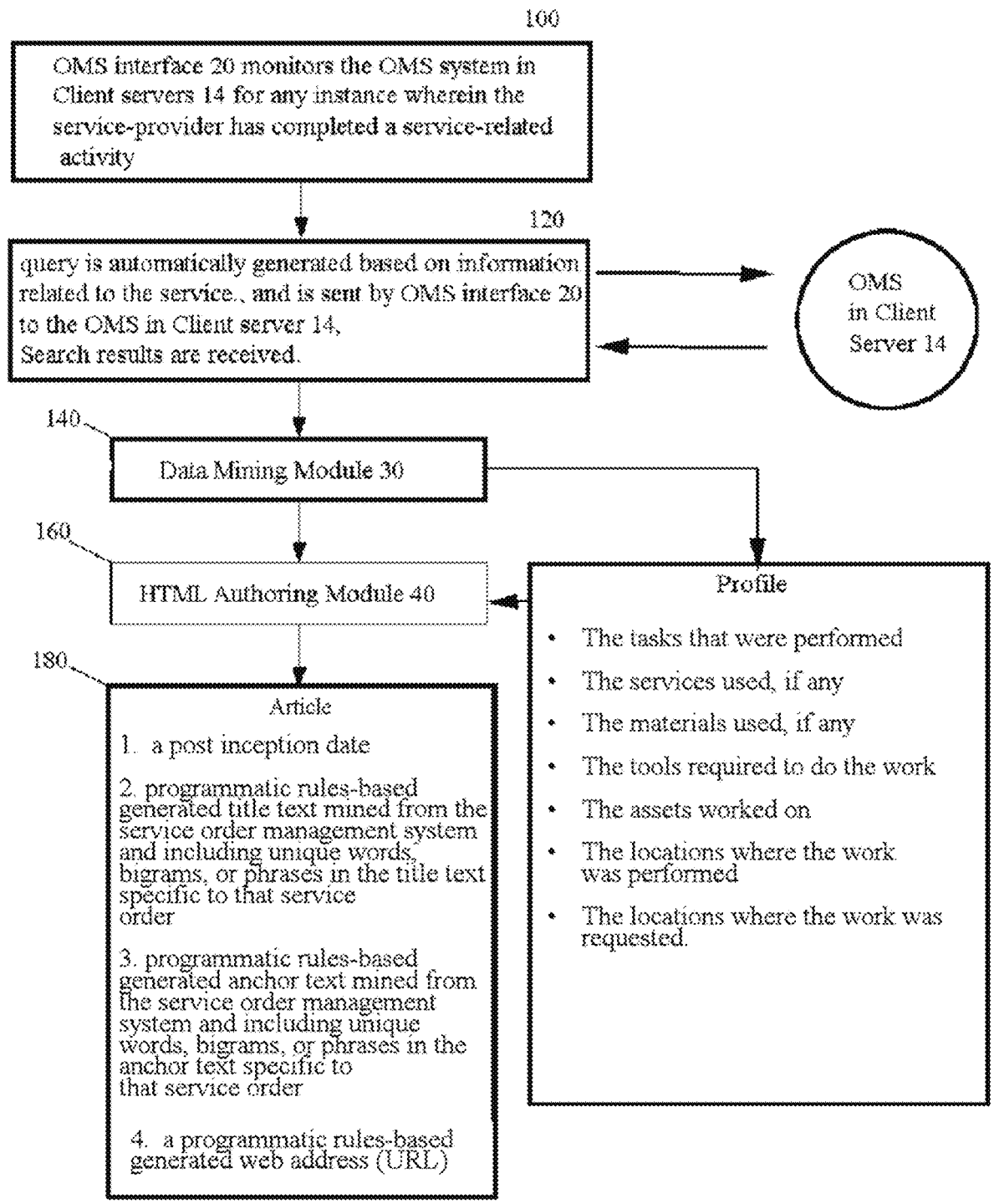
FIG. 2 is a flow chart of the method of the present invention.

FIG. 2 is a flow chart of the method of the present invention.

At step 100 the OMS interface 20 monitors the OMS system in Client servers 14 for any instance wherein the service and/or goods-provider has completed a service and/or order-related activity and/or created a manual data entry to enhance or replace information export capabilities of the service and/or goods-provider's existing order management system. Upon detection of such a completed activity, at step 120 a query is automatically generated based on information related to the service and/or goods. The query is communicated via OMS interface 20 to the OMS management system in Client server 14, from which corresponding search results are eventually received. The OMS interface 20 may be implemented, for example, as a flat file interface that maps search results data from the OMS database to ASCII files (e.g. flat files). This way, data from the OMS database may be selectively read (filtered) and formatted to a generic file format, such as ASCI for temporary storage in staging tables where it may then be processed by the data mining module 30.

At step 140 the data mining module 30 automatically mines relevant content from the OMS interface 20 search results and sends it to the HTML authoring module 40 which auto-generates continuous relevant web content to showcase actual services and/or goods provided, in order to positively influence search engine rankings in response to a key phrase query that is relevant to those services and/or goods. The data mining module 30 employs a programmable ruleset to automatically analyze the OMS search results and compile a profile based thereon for each completed order. These profiles may be displayed to the ASPN 2 and/or its client for approval and/or editing. The data mining module 30 ruleset ensures that all personal information is filtered out, and only mines anchor text comprising seven key elements of information, and writes them to the profile:

The tasks that were performed
The services used, if any
The materials used, if any
The tools required to do the work
The assets worked on
The locations where the work was performed
The locations where the work was requested.

Assuming the ASP or client's express or implicit approval, at step 160 the profiles are passed to the HTML authoring module 40 for auto-generation of content linked to and from the service and/or goods provider's website on Client Server 14.

At step 180 each auto-generated piece of content is incorporated as an article into the service-provider's website to maximize impact on the overall website search engine rankings. Toward this end, each article includes at least 1) an article inception date; 2) programmatic rules-based generated title text mined from the order management system and including unique words, bigrams, or phrases in the title text specific to that service and/or goods order; 3) programmatic rules-based generated anchor text mined from the order management system and including unique words, bigrams, or phrases in the anchor text specific to that service and/or goods order; and 4) a programmatic rules-based generated web address (URL) of the said article.

The process is repeated automatically each time that an order is flagged for publishing, and the result is a continuously updated series of descriptive articles detailing true account of each request for products and/or services, products and/or services provided, and outcomes.

The automatically generated and continuously updated article content showcases actual services provided or products sold, in order to positively influence ranking in a listing of search results algorithmically returned in accordance with said United States Patent Application 20140108428 by Luo Qingshan et al. filed Apr. 17, 2014.

As an example, the above-described system was deployed for an independent automotive repair shop located in Rockville, Md. and servicing Montgomery County, Washington, D.C., and Northern Virginia. The goal was to positively influence search rankings for keyword searches related to Audi®, BMW®, Mercedes Benz®, Mini®, and Porsche® service and repairs in Northern Virginia. The client's Point-Of-Sale system of choice was R.O. Writer®.

Figure 3:
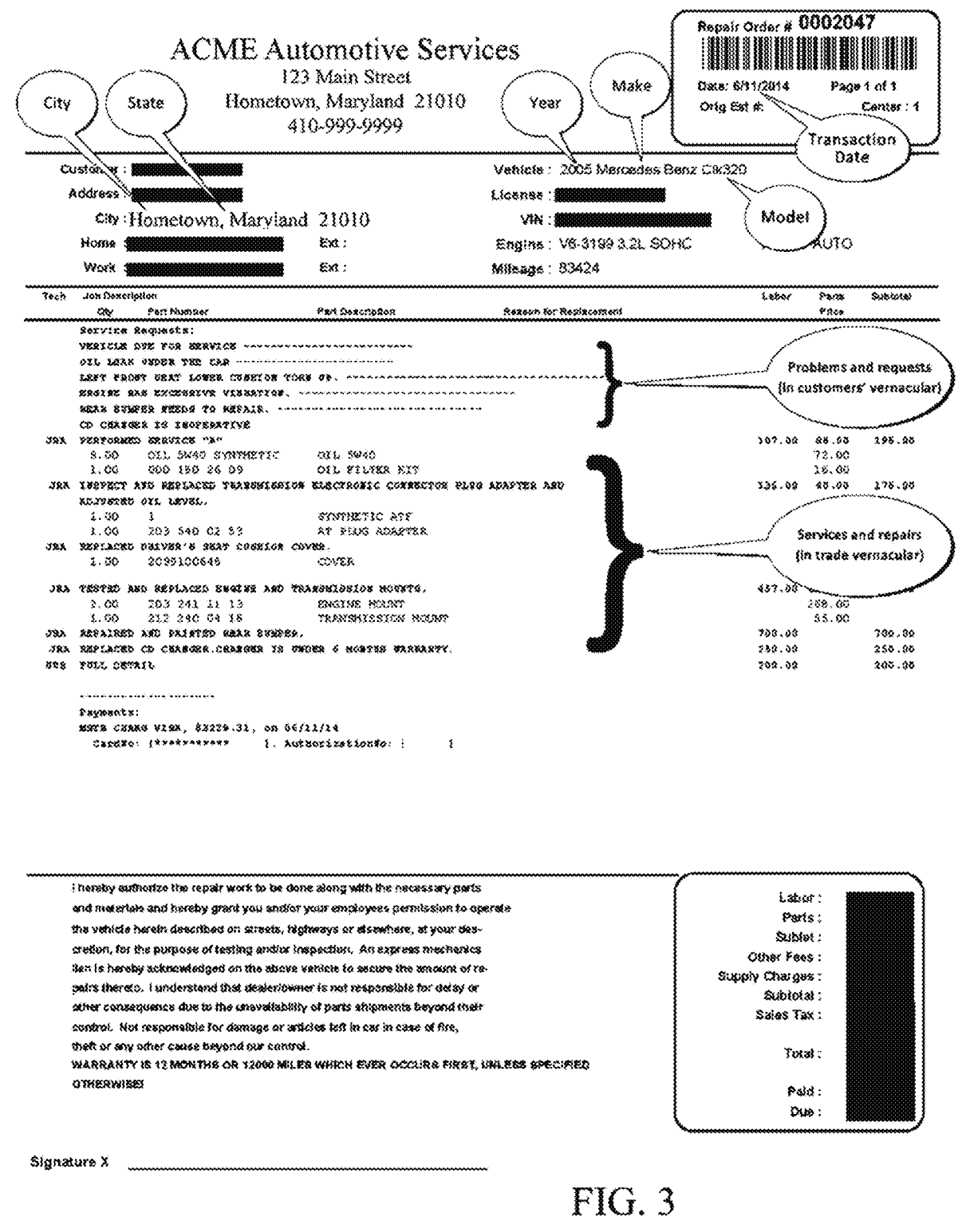

FIG. 3 represents an actual R.O. Writer® invoice as it would be stored in the Client Server 14. The OMS interface 20 monitors the OMS system in Client servers 14 for closure of the invoice. Upon detection of closure the OMS interface 20 compiles a query based on information related to the service (FIG. 2 step 120). The query may include all or part of the information shown on the invoice. The query is communicated via OMS interface 20 to the OMS management system in Client server 14, from which the solicited information is returned as an ASCII file (e.g. flat files). The data mining module 30 programmable ruleset was programmed to automatically analyze the ASCII file and compile a profile based thereon for the completed service order. In this example the data mining module 30 was programmed to mine and select the annotated elements from the OMS invoice including the following: 1) Customer city, state and zip; 2) vehicle year, make and model; 3) transaction date; 4) a statement of the problem and incident requests as dictated in the customer's vernacular; 5) a narrative of the services and parts provided to solve the problem in the mechanics vernacular. These five information elements were used to compile a profile for ASP/client review. One skilled in the art should readily understand that more or fewer information elements may be minded for the profile. These profiles may be displayed to the ASPN 2 and/or its client for approval and/or editing. Once expressly or implicitly approved the profile was sent to the HTML authoring module 40 which at step 180 auto-generated a web page.

Figure 4:
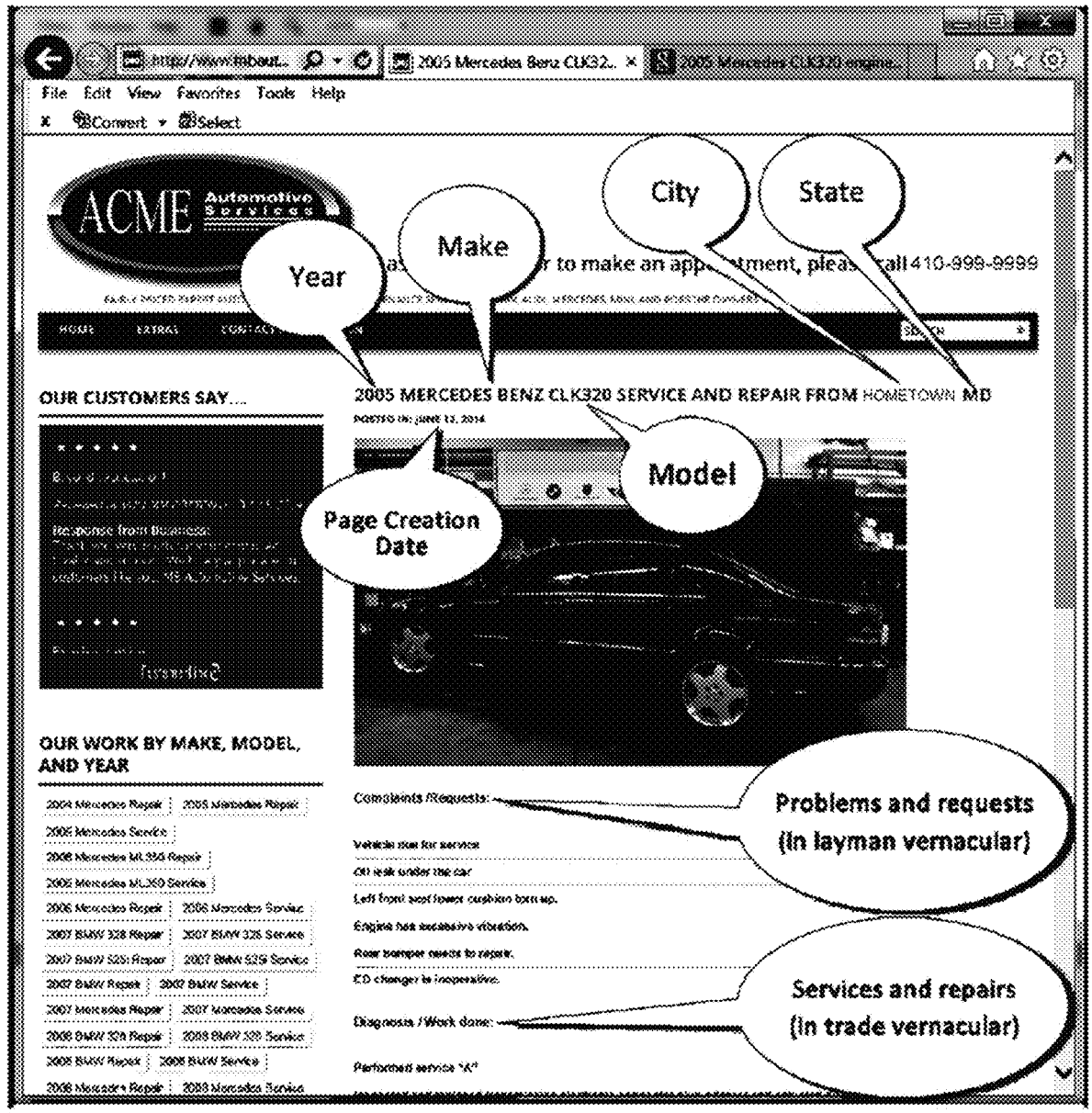
FIG. 4 is an exemplary web page created for the Client with an easily parsed web address (URL), and descriptive tags, according to the present invention.

FIG. 4 is a screen print of the actual web page generated by HTML authoring module 40 which includes all five annotated elements from the OMS invoice, and also including an easily parsed web address (URL), and embedded descriptive tags, as follows:

URL: {client domain name}/{web folder}/{year}-{make}-{model}-{service description}-from-{city}-{state}, or http://www.acmeauto.com/portfolio/2005-mercedes-benz-clk320-service-and-repair-from-hometown-md Title: {year} {make} {model} {service description} From {city}, {state} by {service provider name}, or 2005 Mercedes Benz CLK320 Service and Repair From Hometown, Md. by ACME Automotive META name="description": {year} {make} {model} {service description} From {city}, {state}|{marketing message}, or 2005 Mercedes Benz CLK320 Service and Repair From Hometown, Md. Fairly priced expert automotive repair and maintenance services to BMW, Audi, Mercedes, Mini, and Porsche owners in the Rockville, Md. area by ACME Automotive.

In use, a potential customer would employ a consumer computer 12 (FIG. 1) to access the Google® Search Engine to compile a search. Typically, the customer's location will be determined by Google® location services or manually indicated by the consumer.

Figure 5:
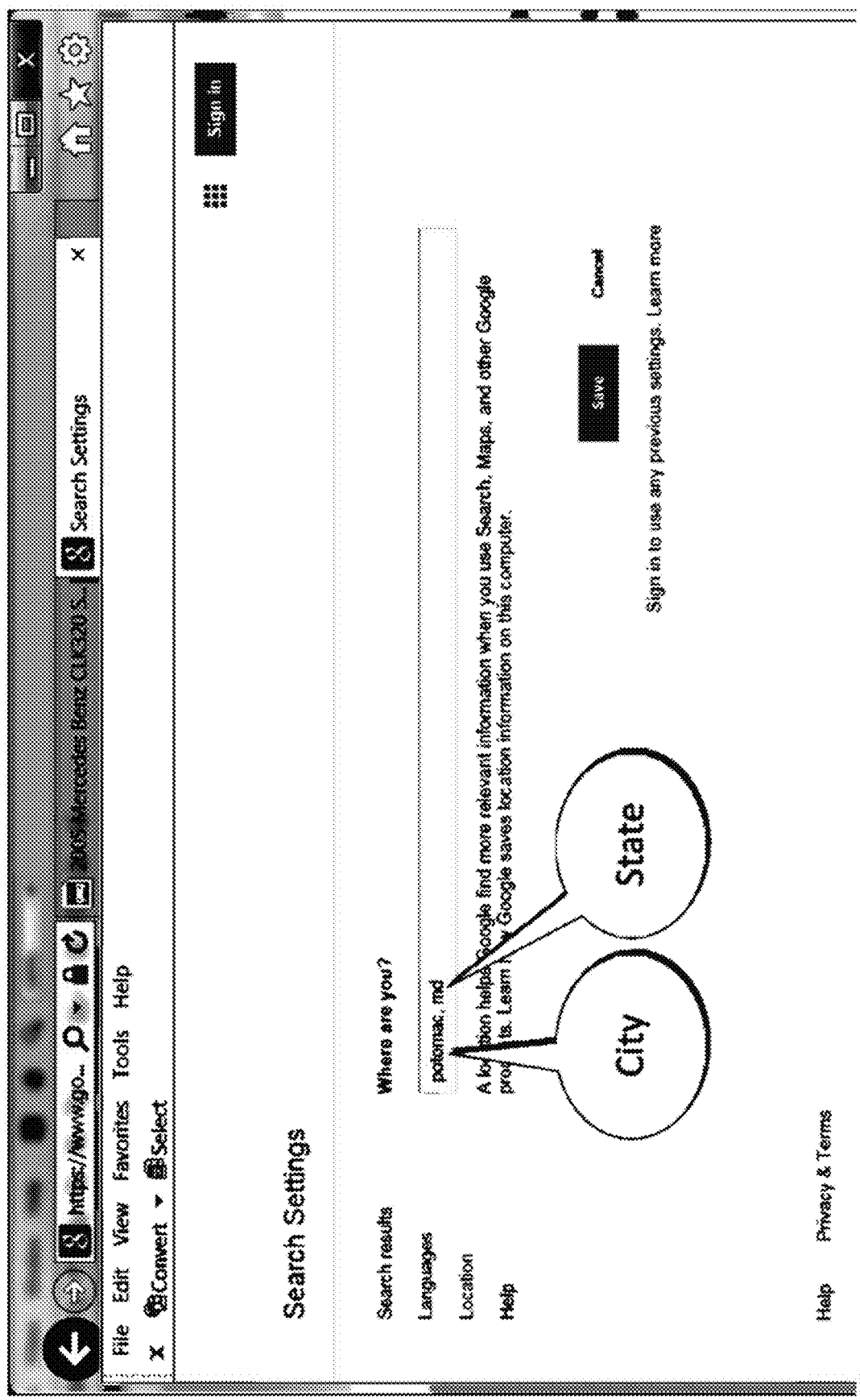
FIG. 5 is a screen print of the consumer instructing the Google® Search Engine of the consumer's location, for example, Hometown, Md.

For example, FIG. 5 is a screen print of the consumer instructing the Google® Search Engine of the consumer's location, for example, Hometown, Md.

Figure 6:
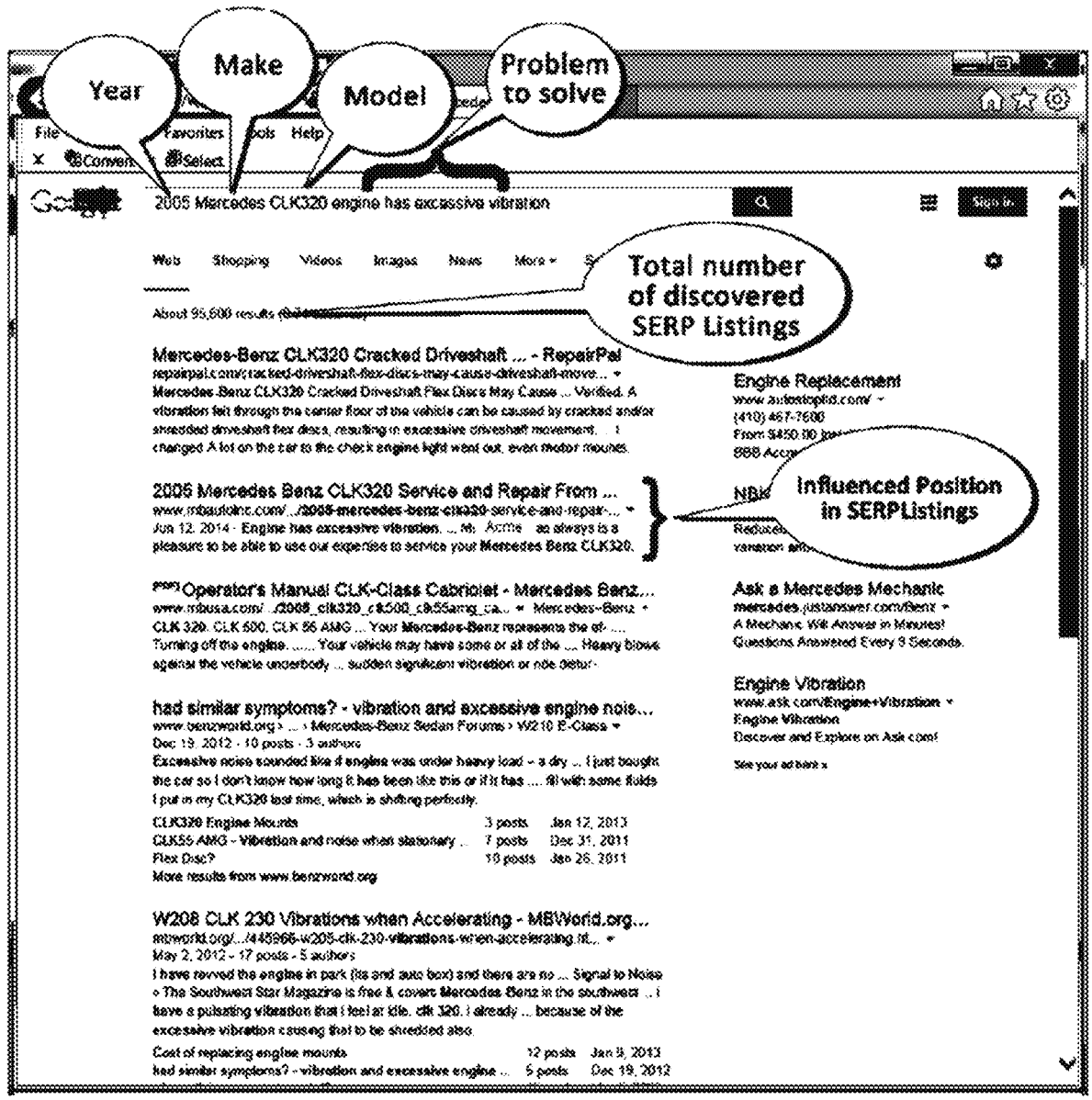
FIG. 6 is a list of search results returned by the Google® Search Engine in response to an information research query for "2005 Mercedes CLK320 engine has excessive vibration" by a consumer located in Hometown, Md., showing #2 ranking out of the total of 95,600 search results.

FIG. 6 is a screen print of the list of search results returned by the Google® Search Engine in response to an information research query for "2005 Mercedes CLK320 engine has excessive vibration" by web searcher located in Hometown, Md., with our Client's web page listed in position #2 out of the total of 95,600 search results.

FIG. 3 is an exemplary service order management system invoice, marked with the profile elements of interest for the data mining module.

FIG. 4 is an exemplary web page created for the Client with an easily parsed web address (URL), and descriptive tags, according to the present invention.

For example, FIG. 5 is a screen print of the consumer instructing the Google® Search Engine of the consumer's location, for example, Hometown, Md.

FIG. 6 is a list of search results returned by the Google® Search Engine in response to an information research query for "2005 Mercedes CLK320 engine has excessive vibration" by a consumer located in Hometown, Md., showing #2 ranking out of the total of 95,600 search results based on indexing of the FIG. 4 exemplary web page according to the present invention.

It should now be apparent that the foregoing system positively influences rank position in a listing of search results returned by major Internet search engines in response to a key phrase query by continuously and automatically generating web content to showcase services that said Client desires to provide and actual work performed.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims, and by their equivalents.

What is claimed is:

1. A method for automatically generating and continuously updating web content to positively influence ranking in a listing of search results, comprising the steps of:

automatically monitoring, by an application server computer, a client computer running an order management system (OMS) software program and identifying completion of each work order using a data mining process;

upon detection of each completed work order, said application server computer automatically querying said OMS for information related to services and/or goods provided under each said completed work order, and compiling a file of information related to the services and/or goods provided;

said application server computer automatically mining relevant information from each said file of information compiled for services and/or goods provided pursuant to each work order based on a pre-programmed ruleset, said mined information at least including a narrative description of completed work and an outcome for said completed work order;

said application server computer sending said relevant mined information to an HTML authoring module;

said HTML authoring module automatically generating HTML-formatted web content from said relevant information indicating the services and/or goods provided under said completed work order, and outcome of said completed work order, and including keywords in said web content associated with the services and/or goods provided under said completed work order configured to positively influence a third party search engine ranking in response to a key phrase query that is relevant to the services and/or goods provided; and posting said web content to an online location.

2. The method for automatically generating and continuously updating web content according to claim 1, wherein said step of querying said OMS for information related to the services and/or goods provided includes compiling a file of selective information related to the services and/or goods provided based on a pre-programmed ruleset.

3. The method for automatically generating and continuously updating web content according to claim 1, wherein said step of mining relevant information includes compiling an ASCII file of relevant information.

4. The method for automatically generating and continuously updating web content according to claim 1, wherein said relevant information comprises at least the following: 1) An item that was sold, provided, fixed, created, modified, or serviced; 2) transaction date; 3) a statement of features, problems, and/or requests as dictated in the customer's vernacular; 4) a narrative of the features, services, and/or parts provided to solve the problem in the seller's vernacular.

5. The method for automatically generating and continuously updating web content according to claim 1, further comprising a step of said HTML authoring module generating a web address (URL) and embedded descriptive tags ruleset based on said relevant information.

6. The method for automatically generating and continuously updating web content according to claim 5, wherein said web address (URL) and embedded descriptive tags include at least the following, URL: {client domain name}/{web folder}/{item};

Title: {item}; and META name="description": {item}.

7. A system for automatically generating and continuously updating web content to positively influence ranking in a listing of search results, comprising:

a client computer including a processor and non-transitory storage media, and an order management system (OMS) software module resident in the non-transitory storage media of said client computer for execution by said processor thereof, said OMS module comprising computer instructions stored on non-transitory computer media for workflow management of orders by customers;

an application service provider (ASP) computer in communication with said client computer via at least one communications network, said ASP computer including a processor and non-transitory storage media, and a modular array of software resident in the non-transitory storage media of said client computer for execution by said processor thereof, said modular array including, an order management system interface comprising computer instructions stored on said non-transitory computer media for monitoring the OMS software module resident at said client computer for completion of a work order;

a data mining module comprising computer instructions stored on said non-transitory computer media for, upon detection of a completed work order, querying said OMS software module for information related to services and/or goods provided under said completed work order, and compiling a file of selective information related to the services and/or goods provided based on a pre-programmed ruleset;

an HTML authoring module comprising computer instructions stored on said non-transitory computer media for automatically identifying keywords in said compiled file of information associated with the services and/or goods provided, and automatically generating HTML-formatted web content that describes the services and/or goods provided under said completed work order using said identified keywords, and an outcome of said completed work order, and configured to positively influence a third party search engine ranking in response to a key phrase query that is relevant to the services and/or goods provided.

8. The system for automatically generating and continuously updating web content according to claim 7, wherein said online location comprises a website of a provider of said services and/or goods that is hosted on said client computer.

9. The system for automatically generating and continuously updating web content according to claim 7, further comprising a programmatic rules-based manual data entry interface to compliment information export limits of the Client OMS module.

10. A computer method for mining data from a client computer including a processor and non-transitory storage media, and an order management system (OMS) software module resident in the non-transitory storage media of said client computer for execution by said processor thereof, comprising the steps of:

automatically monitoring the OMS software module at said client computer for completion of each work order by an application service provider (ASP) computer running software for carrying out the steps of, automatically detecting each completed work order, automatically querying said OMS module upon detection of a completed work order for information related to the completed work order, copying a file of selected information related to the completed work order, said file of selected information at least including a narrative description of completed work or symptoms that prompted said work to be performed;

mining relevant information from said copied file based on a pre-programmed ruleset, said mined information at least including one of said narrative description of said work or symptoms that prompted said work to be performed;

automatically identifying keywords in said mined relevant information; and automatically generating HTML web content that presents said completed work or symptoms that prompted said work to be performed under said completed work order using said identified keywords, plus an outcome of said completed work order, and configured to positively influence a third party search engine ranking in response to a key phrase query that is relevant to the services and/or goods provided, automatically posting said auto-generated HTML web content to a website to showcase said services and/or goods provided.

11. The system for automatically generating and continuously updating web content according to claim 7, wherein said HTML authoring module is configured to post said web content as an article into a website of a provider of the services and/or goods to maximize impact on the overall website search engine rankings.

* * * * *